Oct. 18, 1966     H. AMREHN     3,280,327
BUOYANCY TYPE APPARATUS FOR DETERMINING HYDROGEN
CONTENT IN FLUIDS WITH GAMMA RAYS
Filed July 13, 1962
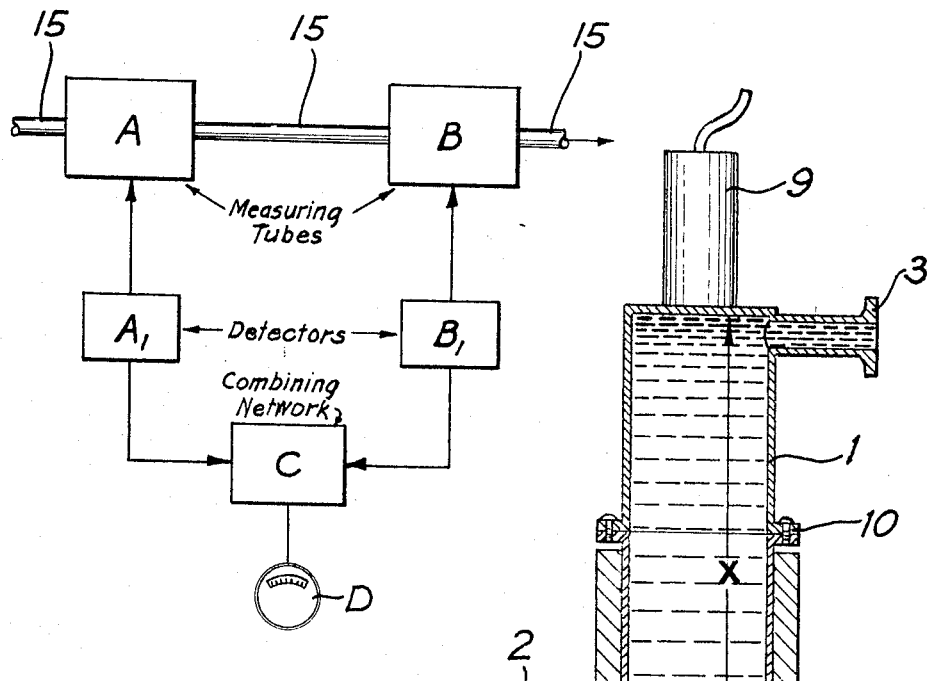
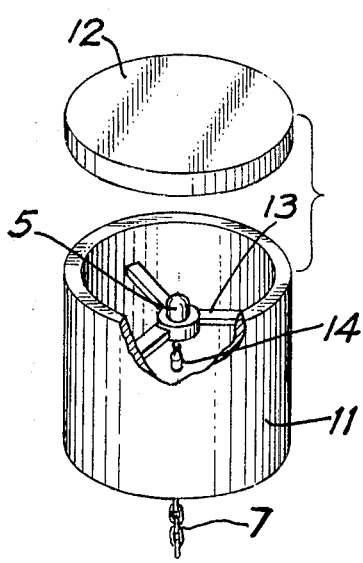
INVENTOR
HERMANN AMREHN
BY Toulmin & Toulmin
ATTORNEYS

United States Patent Office 3,280,327
Patented Oct. 18, 1966

3,280,327
BUOYANCY TYPE APPARATUS FOR DETERMINING HYDROGEN CONTENT IN FLUIDS WITH GAMMA RAYS
Hermann Amrehn, Marl, Kreis Recklinghausen, Germany, assignor to Chemische Werke Hüls A.G., Marl, Kreis Recklinghausen, Germany
Filed July 13, 1962, Ser. No. 209,527
Claims priority, application Germany, July 14, 1961, C 24,611
5 Claims. (Cl. 250—43.5)

The present invention relates to an apparatus and system for determining the relative hydrogen content in comparison with the remaining atoms in a fluid or liquid by means of gamma rays.

The knowledge of the ratio of, for example, hydrogen to carbon or other atoms in liquids is very often important in and for production control systems. For example, if two different hydrocarbons are to be mixed, the ratio of mixing has to be controlled very accurately.

It is known to determine the ratio of hydrogen to the remaining atoms by means of beta rays. This method has a great disadvantage in that the depth of penetration of beta rays is very small due to the small range thereof. Thus, the medium under investigation can have a thickness of a few millimeters only at the testing point. Furthermore, this medium must not be under pressure because the window through which the beta rays enter has to be thin in view of the short range, and therefore the window cannot take up any pressure.

It is a primary object of the present invention to provide a new measuring apparatus capable of producing results which very accurately indicate the ratio of hydrogen atoms to remaining atom in fluids or liquids. Such ratio will be referred to hereinafter as H/R-ratio.

It is another object of the present invention to provide a measuring device for the relative hydrogen content in liquids using high energy gamma rays.

It is another object of the present invention to provide a novel apparatus permitting continuous measurement and supervision of the H/R ratio in flowing liquids while eliminating the influence of a changing density thereof.

It is a further object of the present invention to make use of the fact that the coefficient for the Compton scattering of gamma rays in liquids is directly proportional to the product of density times the ratio of atomic number over atomic weight.

It is still a further object of the present invention to eliminate the influence of a changing hydrogen content in liquid density measuring devices.

According to one aspect of the present invention in a preferred embodiment thereof, it is suggested to provide a hollow container, preferably a vertically disposed tube which is closed on top and bottom. The top is provided as detector window and a gamma radiation detector is disposed on this top of the tube at such window. Close to the top of the tube is a liquid outlet; a liquid inlet is disposed below thereof but not quite near the bottom of the tube so that a calm zone is defined between the bottom and this liquid inlet. A regularly, for example, spherically shaped member floats freely in this calm zone. A gamma radiation source is disposed in this member preferably in its center or at least on a vertical line taken through the center of gravity of this floating member. A buoyancy adjustment chain is suspended from the bottom of the floating member, which chain is partially suspended freely and partially is lying on the bottom during operation.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 1 is a cross sectional view through an apparatus in accordance with the preferred embodiment of the invention, FIG. 2 illustrates perspectively an exploded view of an alternative element for the floating member illustrated in FIG. 1, and FIG. 3 illustrates diagrammatically an improved liquid density measuring device.

In FIG. 1 of the drawing there is shown a tubular container 1 comprised of an upper and a lower portion, which portions are joined by means of flanges 10 so as to render the interior of the tube more easily accessible. Tubular container 1 is closed on top and bottom. At about the middle of the lower portion there is an inlet pipe 2 and near the top of container 1 there is a tubular outlet pipe 3. By means of suitable pipes, hoses or the like, the liquid to be tested is fed to and through inlet pipe 2, into the container 1, and such liquid is discharged therefrom through outlet pipe 3. This way makes it possible that the measurment is carried out in a continuous process. The inlet pipe 2 is connected to container 1 leaving therein a calm zone since the general flow of liquid is upwards, towards outlet 3. Thus, the zone below the aperture with which pipe 2 terminates at the inner wall of container 1, is not or hardly subjected to any liquid flow.

In this calm zone floats a spherical or globular swimmer which is comprised of a hollow member 4 having centrally affixed a carrier 6 for a source of gamma rays, particularly a limited quantum of radioactive material, preferably CS-137, but also Co-60 can be used. The spherical, hollow member 4 is completely closed so that it is capable of floating indeed.

Carrier 6 may also be used as additional support for removable weights so as to preliminarily adjust the total weight of member 4 to the required degree of buoyancy in a given liquid. If the liquid to be tested is changed so that its specific weight differs from that of the previously tested liquid, it might be necessary to readjust the total weight of member 4 so as to render it floatable again. This can be carried out by adding or removing such weights.

At the lowest point of member 4 is secured one end of a multi-link-chain 7 also called buoyancy adjustment chain. Some links of chain 7 rest on the bottom of tube 1. The remaining links are suspended from member 4 so that the effective weight thereof in the liquid is determined by the weight of member 4 itself and by the weight of those links suspended therefrom and not lying on the bottom of container 1.

At a given density of the liquid the member 4 will float therein and a particular number of links of chain 7 is then suspended therefrom, thus being supported by member 4 and adding to its weight. If the density of the liquid decreases, the member 4 will sink, thus reducing the number of links suspended therefrom and increasing accordingly the number of links lying on the bottom of tube 1. The total and effective weight of member 4 decreases accordingly and the sinking of member 4 will be terminated when a new buoyancy balance has been established.

Conversely, when the density of the liquid increases, the member 4 will raise, thus lifting more links from the bottom of tube 1, until the total weight of the now effectively heavier member 4 with the then increased number of suspended links of chain 7 is again buoyantly balanced in the then denser liquid.

It will be appreciated that the degree of lifting or lowering of member 4 i.e. the geometrical path or distance defining the changing position of member 4 in tube 1 depends on the weight of the individual links of chain 7. It has been found that one can select the individual weight of the links so that product of density $\rho$ and distance X remains constant in spite of a changing value for $\rho$.

The distance X is measured within the liquid only, between the outer top of member 4 and the inner top of tube 1. In a preferred design, tube 1 has an inner diameter of 10 to 20 cm. i.e., about 4" to 8", preferably 15 cm. (6"). The distance X preferably is selected so as to vary within the range of 40 to 70 cm. (16" to 28"). The weight of member 4 alone is to be about 0.5%–5% below the weight of the amount of liquid displaced by it. Thus, the remaining weight percentages are filled up by the links of chain 7 suspended freely from the bottom of member 4. The weight of the links and of the chain is determined by the condition, $\rho \cdot X$=constant, where $\rho$=density and X=distance.

The diameter of floating member 4 is slightly less (about 5 to 10%) than the diameter of tube 1, so as to ensure free floating therein. Particularly, there must be sufficient clearing space between the walls of tube 1 and the largest width of floating member 4. On the other hand, it will be appreciated that one should not make this space (difference of diameters) too large, because this could increase the total volume of the calm zone of tube 1, and thus increase the amount of more or less stagnating liquid therein.

The tube 1 is covered with a protective shield 8 against radioactive radiation. This shield 8 is preferably made of lead and extends upwardly sufficiently high so as to avoid escaping of gamma rays.

It will be appreciated that floating member 4 does not have to have a particular shape, its only requirement is that it is permitted to float freely without clamping. Since one will preferably select as a tube 1 an element of cylindrical cross section, member 4 preferably will be a sphere or a cylinder. One can use a cylindrical box such as illustrated in FIG. 2, with a main box container 11 preferably made of nuclear radiation-absorbing material and the lid 12 acting as window for the gamma-radiation. A spider 13 is secured to inner wall of container 11 and supports the source 5 consisting of radioactive material emanating the gamma rays.

FIG. 2 shows also that small weights such as 14 may be suspended inside of box 11, from the center of spider 13. FIG. 2 illustrates clearly that the fastening point of chain 7 to the floating member must be of such nature not to upset the balance. In other words, fastening point and center of gravity of member 4 must be on a straight vertical line. In case one uses the box shown in FIG. 2, the chain 7 must be fastened at the center of the outer bottom of box 11 and the spider 13 must be disposed symmetrical to the vertical outer axis of box 11. It must be avoided that this outer axis of cylindrical box 11 with window-lid 12 tilts when floating in the liquid in tubular container 1.

Going back for a moment to FIG. 1, the sphere 4 itself (i.e. without elements 5 and 6) has no center axis so that during floating, the fastening point of chain 7 will be the lowest point of member 4 anyway. However, upon placing support 6 and source 5 into the member 4, it must be observed that the center of gravity of member 4 together with elements 5 and 6 is on the line between the geometrical center of sphere 4 and the fastening point of chain 7 thereto. On top of tube 1, on the outside thereof, there is provided a conventional nuclear radiation detector such as an ionization chamber or a scintillation counter or the like. This detector 9 measures and is responsive to the radiation from source 5 which has not been absorbed by the liquid in tube 1 extending therein through distance $x$.

The operation and effectiveness of the device disclosed thus far will become more apparent from the following description thereof.

If a gamma radiation penetrates a substance, a portion of the radiation will be absorbed therein in accordance with the law $$I = I_0 \cdot e^{-\mu x}$$

with $I_0$ being the intensity of the ratiation when entering such substance, $\mu$ being the absorption coefficient thereof and I being the remaining intensity of the radiation after having passed through the substance for the distance $x$. The attenuation of the radiation is produced by three effects: The photo absorption (coefficient—$\tau$), the Compton scattering (coefficient—$\sigma$) and the production of electron-positron pairs (coefficient $p$), so that there is an equation $$\mu = \tau + \sigma + P$$

Naturally, every one of these coefficients depends upon the energy E of the radiation. For example, no electron-positron pairs can be produced below a certain energy level. Also, these coefficients are proportional to the density $\rho$ of the substance, and finally they depend upon the atomic number Z and the atomic weight A of the substance.

As a first approximation, one can write the following three equations:

$$\tau = f_1(E) \cdot \rho \cdot Z^4 / A$$
$$\sigma = f_2(E) \cdot \rho \cdot Z / A$$
$$P = f_3(E) \cdot \rho \cdot Z^2 / A$$

In the range of quantum energies of the radiation including 0.4 to 1.2 m.e.v., $\sigma$ (Compton scattering) is the prevailing coefficient for elements from Z=1 to Z=25 so that $\mu \cong \sigma$. It follows therefrom, that for a given radiation energy E taken from this energy range, the attenuation is linearly dependent upon the product of density $\rho$ and the ratio Z/A. For hydrogen with Z=A=1, Z/A is also 1, for atoms of Z=2 to Z=20, Z/A=0.5. For still higher atomic numbers, Z/A declines monotonously and is, for example, for lead 0.39. Thus if radiation penetrates a substance, for example, an organic composition or mixture of organic compounds, the value Z/A is an average value including the relative proportions of occurrence of the several atoms and their individual Z/A ratio.

The hydrogen atoms attenuate the radiation at least twice as much as the other types of atoms. Thus, whenever the ratio of the hydrogen atoms to remaining atoms (H/R-ratio) composition is altered, the amount of attenuated (or inversely, the passing) radiation will be altered in direct proportion thereto. However, the attenuation formula given above indicates also that total attenuation is determined by $f_2(E) \cdot Z/A \cdot \rho \cdot X$, with the product $\rho \cdot X$ being considered constant, otherwise any change in the radiation could not exclusively be attributed to a change in the H/R ratio.

The apparatus described above provides for a constant $\rho \cdot X$ value throughout the measurement. The radiation source suggested primarily is CS–137 and emanates gamma rays having a quantum energy of 0.65 m.e.v.; thus, Compton scattering prevails indeed in organic liquids. The radiation detected with the apparatus 9 then indicates indeed any change in the relative content or H/R ratio of the liquid passing through tube 1. Cobalt-60 emanates gamma rays of 1.1 to 1.2 m.e.v. so that also Compton scattering produced by this substance is prevailing.

Since the measuring of the gamma radiation passing through a path X in the liquid results in values independent of any density changes, the inventive apparatus can be employed also to eliminate the influence of a changing hydrogen content in radioactive density measuring devices. Radioactive density measurement (see for example Greer 2,735,944 or Hare 2,304,910) are carried out in attaining a value indicative of the product $p \cdot Z/A$. If the hydrogen content changes in such liquid, the effective $Z/A$-value changes accordingly, resulting in a change of the detected radiation even though the density $\rho$ has remained constant. FIG. 3 illustrates how one can eliminate the influence of a changing liquid composition in density measuring apparatus.

In FIG. 3 there is a liquid pipe 15 being passed through by the liquid to be tested. A conventional density measurement A such as, for example, disclosed in Greer (supra) is inserted in the pipe and is succeeded by a measuring device B as illustrated in FIG. 1 with inlet 2 and outlet 3 connected to pipe line 15. The influence of the changing hydrogen content upon the density measurement can be eliminated with such a combination. Both measurements are carried out with radiation detectors $A_1$ and $B_2$ respectively, and they produce electrical outputs accordingly. Such outputs are combined in an electronic network C. For example, both outputs can be suitably amplified and superimposed in a multiple grid type electron tube, the anode output of which then is fed to an indicating instrument D which is calibrated in values of density.

In the following table, datas are given for an H/R-ratio measuring device as illustrated in FIG. 1 (or B in FIG. 3) to be employed for fluids having a hydrogen content of 40 to 60% and an average liquid density of 0.85 g./cm.³.

Inner diameter of the measuring tube (1) _____ 150 mm.
Diameter of floating member 4 being made of high-grade steel with a wall thickness of 2.2 mm. and having a polished surface _____ 140 mm.
Average weight of displaced fluid _____ 1220 g.
Weight of floating member (4) including support 6 and radioactive source 5 but excluding chain 7_____ 1210 g.
Distance $x$ at $\rho = 0.85$ g./cm.³ _____ 630 mm.
Area-weight $(X \cdot \rho)$ _____ 53.55 g./cm.².
Change of height of member 4 at $\rho \cdot X = 53.55$ g./cm.²=constant_____ ±15 mm.
Weight per unit length of chain 7_____ 0.08 g./mm.
Length of chain when suspended at $\rho = 0.85$ g./cm.³ _____ 120 mm.
Length of chain when lying on bottom of tube 1_____ 100 mm.
Intensity of source 5 when Cs–137 is utilized_____ 500 mc.
Wall thickness of tube 1 adjacent detector 9_____ 5 mm. (high-grade steel).
Wall thickness of detector 9 thereabove _____ 1 mm. (brass).
Detector_____ scintillator counter (NaJ–crystal).
Size of NaJ–crystal _____ 35 mm. diameter.
Rate of counting of the detector at hydrogen content between 40 to 60%_____ 3,800 to 4,600 pulses/sec.
Hydrogen content sensitivity _____ ±0.1 to 0.2%.
Maximum pressure in tube 1_____ 7 atm. (absolute).

The invention is not limited to the embodiments described above.

A conceivable modification is, for example, a modification of the device of FIG. 1 in which there is a common inlet and outlet, so that measurement is carried out only occasionally.

Another modification is to provide for a radiation-shielding of floating member 4 itself with a window at the top so that no heavy outer shielding (8) or only a thin shielding layer is necessary to limit the total amount of the radiation to which all of the liquid is subjected. In case of FIG. 2, the box 11 may be of radiation-shielding material and the lid 12 then is the non-shielding window.

Other changes and modifications thereof not constituting departments from the spirit and scope of the invention are also conceivable and intended to be covered by the following claims:

What I claim is:

1. Apparatus for measuring the ratio of hydrogen atoms to remaining atoms in fluids, comprising in combination: a container for the fluid; a hollow carrier disposed in said container and floating in the fluid therein and completely submerged at all times; a gamma-ray source situated in the center of said carrier; at least one buoyancy adjustment chain secured to said carrier at the outside thereof with portions of said chain suspended from said carrier and other portions of said chain resting on the bottom of said container; and gamma-ray receiving means being centrally affixed to the top of said container so that the distance between said gamma-ray source and said receiving means constitutes the measuring region, said distance being variable with varying density of said fluid, wherein the product of said distance and said density is maintained constant by portions of said buoyancy adjustment chain suspended between said carrier and said bottom of the container.

2. Apparatus for continuously determining the relative content of hydrogen atoms in a liquid comprising: a vertically disposed tube being closed on both ends as container for the liquid during measurement; first and second aperture means at said tube, said first aperture means disposed adjacent the upper end of said tube, while said second aperture means is disposed below said first aperture means whereby the liquid between said second aperture means and the lower end of said tubes define a calm zone; a hollow carrier disposed in said tube and floating in said calm zone of said liquid completely submerged at all times; a buoyancy adjustment chain secured to the bottom of said carrier and being suspended therefrom with portions thereof resting on the bottom; a source of gamma rays in said carrier; and a gamma-ray detector disposed on top of said tube, said detector, said source of gamma rays and the point of securing said chain to said carrier defining a common vertical axis.

3. Apparatus according to claim 2, wherein the hollow carrier for the gamma ray source is provided with means including weight members centrally affixed to said carrier for further correction of balance and buoyancy thereof.

4. Apparatus for determining the relative content of hydrogen atoms in liquids comprising: a measuring container for said liquid; a source of gamma radiation suspended in said liquid in said container; a gamma ray detector outside of said container and defining a distance measuring region from said source and through said liquid; and means supporting said source and substantially completely submerged in said liquid at all times and further comprising buoyancy adjustment chain means with portions of said chain means suspended from said means supporting wherein said means supporting and said suspended portions are responsive to a density change of the liquid for changing said distance whereby the product of the length of said measuring region times density remains substantially constant during measurement.

5. In a density measuring device for liquid, comprising: a conventional liquid density measuring device responsive to the product of density times the ratio of atomic number over atomic weight and producing an output in accordance therewith; a measuring container; means for passing the same liquid measured by said conventional density measuring device through said container; a source of gamma radiation suspended in said liquid in said container; a gamma ray detector outside of said container and defining a measuring region from said source and through said liquid; and means supporting said source in the liquid and further comprising buoyancy adjustment chain means with portions of said chain means suspended from said means supporting wherein said means supporting and said suspended portions are responsive to a density change of the liquid for changing said distance whereby the product of the length of said region times density remains substantially constant during measurement.

References Cited by the Examiner

UNITED STATES PATENTS

| | | | |
|---|---|---|---|
| 594,600 | 11/1897 | Chamberlain | 9—8 |
| 1,801,729 | 4/1931 | Elliott | 9—8 |
| 2,899,555 | 8/1959 | Fries | 250—43.5 |
| 2,961,539 | 11/1960 | Egan | 250—43.5 |
| 2,963,583 | 12/1960 | Lebourg | 250—43.5 |
| 2,965,753 | 12/1960 | Reynolds | 250—43.5 |
| 2,972,050 | 2/1961 | Allen | 250—43.5 |

RALPH G. NILSON, *Primary Examiner.*

JAMES W. LAWRENCE, *Examiner.*

S. ELBAUM, *Assistant Examiner.*